United States Patent [19]

Wen-Chiang

[11] Patent Number: 5,392,719
[45] Date of Patent: Feb. 28, 1995

[54] RENOVATED INCINERATOR

[76] Inventor: Hung L. Wen-Chiang, No. 1, Liu Tsuoh, Liu Tsuoh Li, Chia-Yih City, Taiwan, Prov. of China

[21] Appl. No.: 194,422

[22] Filed: Feb. 10, 1994

[51] Int. Cl.⁶ ............................................. F23B 7/00
[52] U.S. Cl. ........................... 110/234; 110/165 R; 110/204; 110/259
[58] Field of Search ............... 110/204, 258, 165 R, 110/259, 234

[56] References Cited

U.S. PATENT DOCUMENTS 5,161,471  11/1992  Piekos ........................ 110/165 R
5,261,335  11/1993  Blevins, Jr. ................. 110/204 X Primary Examiner—Edward G. Favors
Attorney, Agent, or Firm—Morton J. Rosenberg; David I. Klein

[57] ABSTRACT

A renovated incinerator is essentially composed of a furnace, a circulation means, and an exhausting means. The circulating means picks up any particle which is unburned or not burned thoroughly and delivered to the furnace for continuous burning until all waste material become ashes which are collected and forming asbestos. A circular water tank is integrally formed surrounding the furnace to utilize steam from boiling water in the tank to generate power.

2 Claims, 6 Drawing Sheets

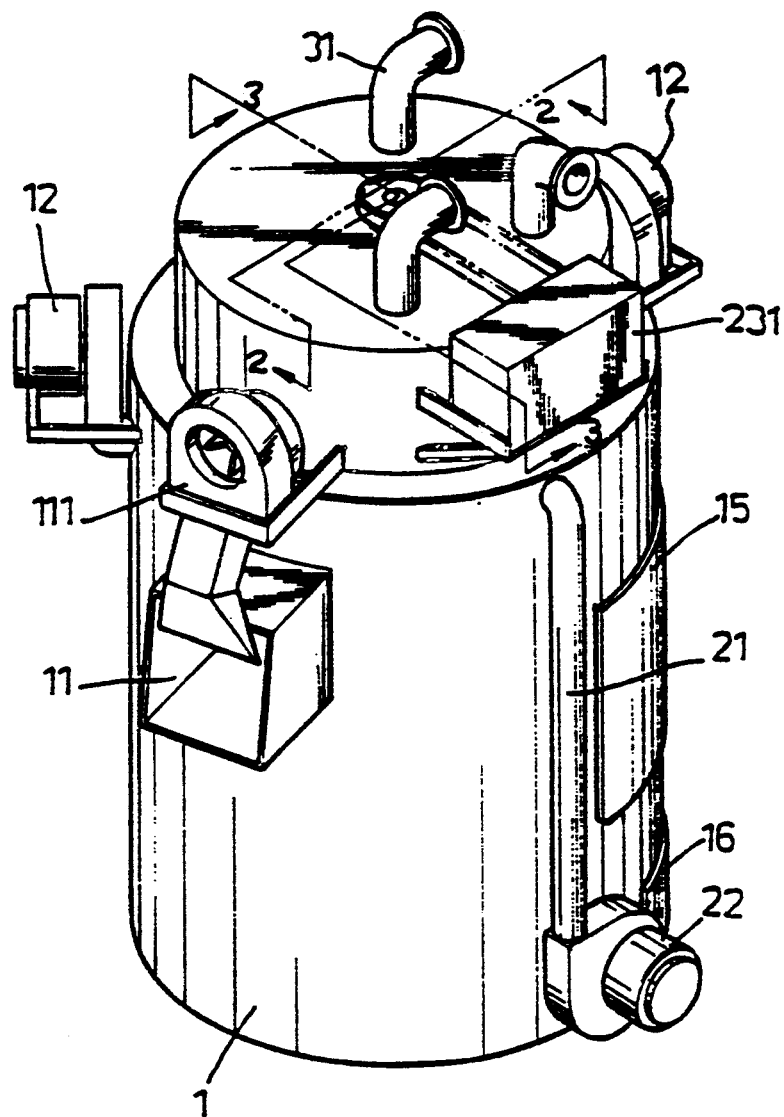
F I G. 1

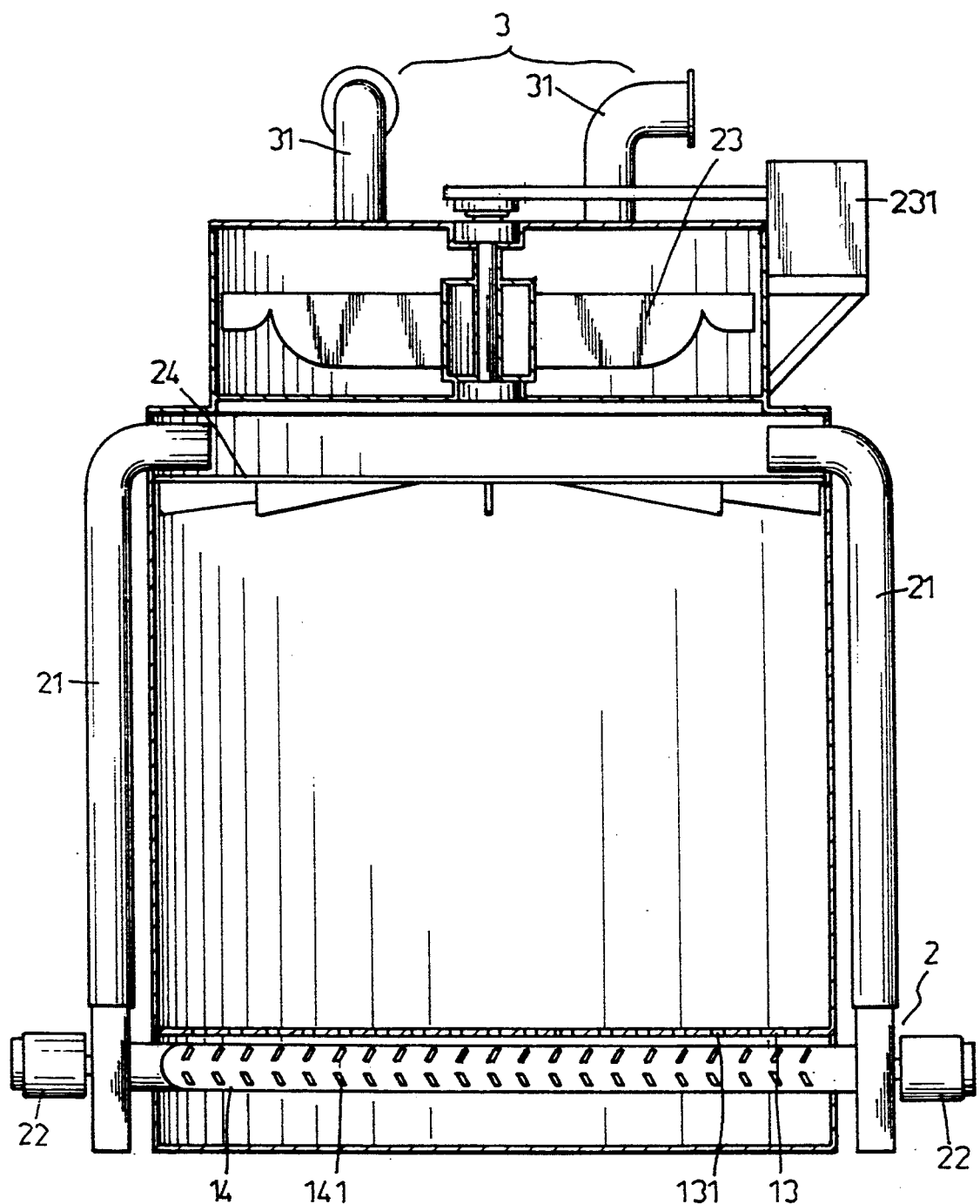
F I G. 3

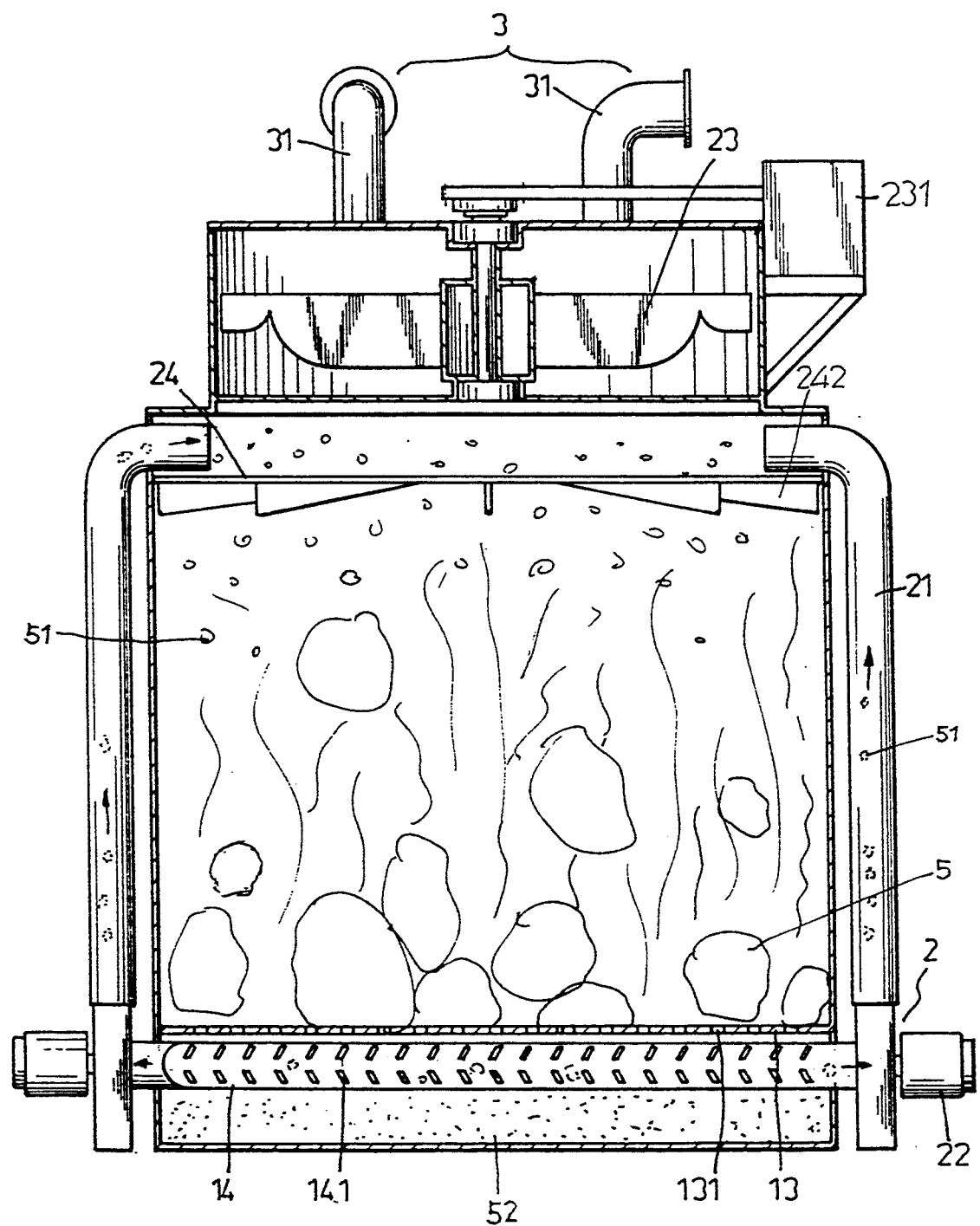
F I G. 5

RENOVATED INCINERATOR

FIELD OF THE INVENTION

This invention relates to an incinerator, more particularly, to an incinerator to protect air from pollution and to generate power with the steam created by boiling water from burning waste material.

BACKGROUND OF THE RELATED ART

Owing to more and more waste material are produced these days than before, it is difficult to find enough space to bury waste. Therefore, incinerators are adopted to burn out flammable wastes to minimize the requirement of bury field. The heat resulting from burning waste is used to boil water for further usage. However, it is found that incinerators of prior art can not burn waste thoroughly and large particles are found blown out with the smoke through chimney which causes air pollution.

The inventor, in view of this, has invented the present invention which made improvement on the above mentioned shortcomings.

SUMMARY OF THE INVENTION

It is the primary object of the present invention to provide a renovated incinerator which will not cause any air pollution.

It is another object of the present invention to provide a renovated incinerator which utilizes the heat to boil water.

It is still another object of the present invention to provide a renovated incinerator which uses the steam of the hot water to generate power.

It is a further object of the present invention to provide a renovated incinerator which utilizes the burned ashes to reproduce a secondary product.

BRIEF DESCRIPTION OF THE DRAWINGS

FIG. 1 is a perspective of an incinerator of the present invention;

FIG. 3 is another side sectional view taken along line 3—3 of FIG. 1;

FIG. 5 is another side sectional view of the present invention showing a circulating means.

DETAILED DESCRIPTION OF THE PREFERRED EMBODIMENTS

Figure 2:
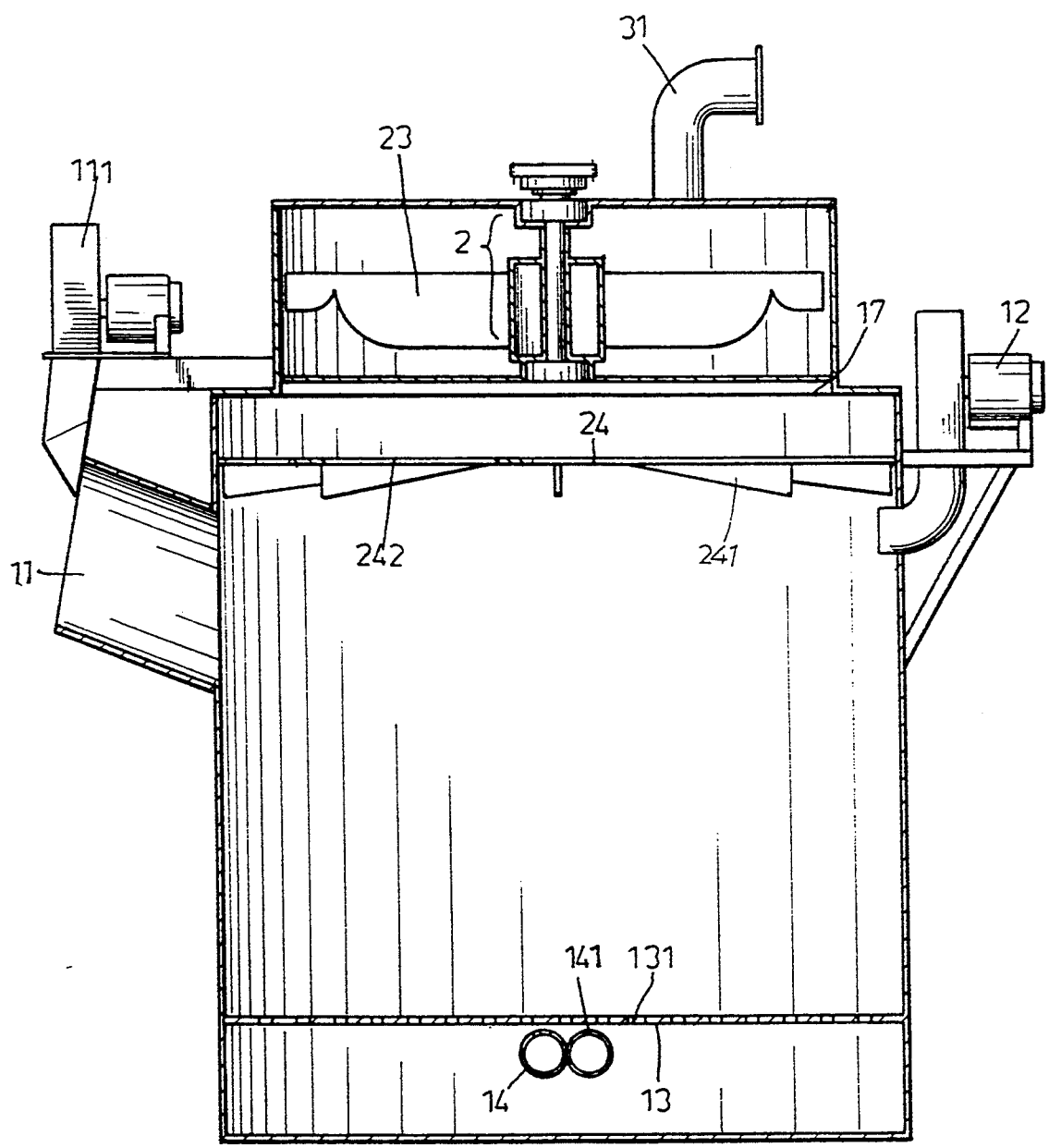
FIG. 2 is a side sectional view taken along line 2—2 of FIG. 1.

Referring now to the drawings wherein the showings are for the purpose of showing preferred embodiments and not for the purpose of limiting the same, FIGS. 1, 2, and 3 showing a furnace 1 having circulating means 2, and an exhausting means 3.

The furnace 1 includes an opening 11 at one side as chute to dump waste material into the furnace 1, a blast fan 111 on top of the opening 11 adopted to blow air into the furnace 1 from the opening 11 to prevent smoke from blowing out therefrom. A pair of blast fans 12 on respective upper portions to blow air into the furnace 1. A partition 13 having a plurality of holes 131 is secured to the inner lower portion of the furnace 1, and a pair of tubes 14 under the partition 13 having a plurality of holes 141 thereon having the respective ends extending outwardly, a larger door 15, and a smaller door 16. The circulating means 2 includes a pair of conveying pipes 21 at respective outer end with the bottom connected to the tubes 14 through a pair of blast fans 22, respectively and the top portions of the pipes 21 are extending into the inner top portion of the furnace 1 as an input to convey the larger particles 51 being sucked by the pipes 14 into the furnace again for continuous burning, a fan 23 at inner top portion above the input end of the pipe 21, and a guide plate 24 at inner portion under the input end of the pipe 21. The guide plate 24 has guide blades 241 and guide trough 242 integrally formed.

The exhausting means 3 includes a plurality of exhausting pipes 31 on top of the furnace 1, and blast fans 32 to blow out smoke therefrom.

A screen device 4 at one side next to the furnace 1 having an arcuate screen 41 and a sedimentary tank 42 at bottom portion thereof.

In order to prevent the high temperature from dissipating too fast, asbestos 17 is inserted inbetween each component.

Figure 4:
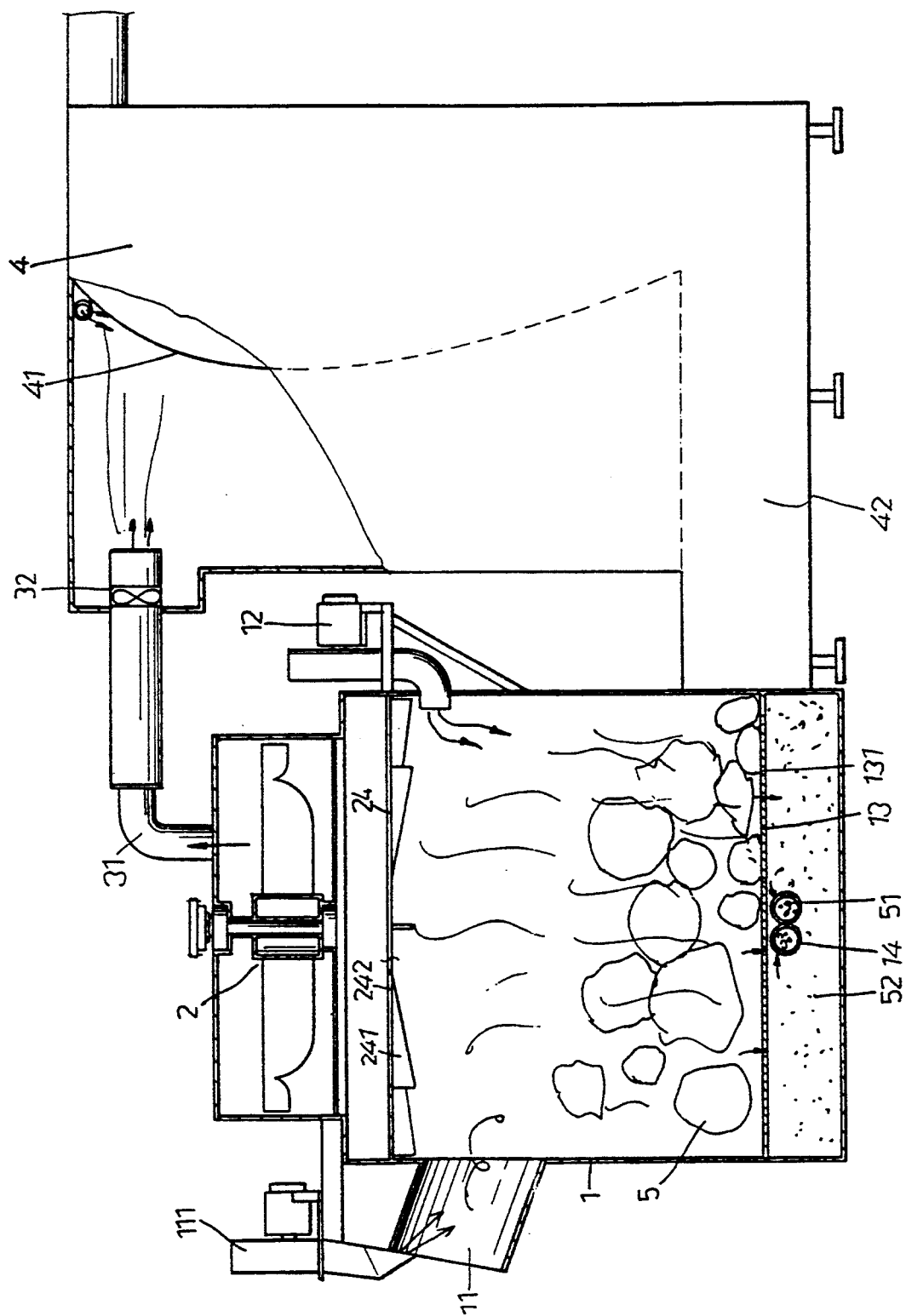
FIG. 4 is a side sectional view of the present invention showing smoke and ashes being collected by a sedimentary tank.

In operation, waste material 5 is dumped into the furnace 1 through the opening 11 for burning. The blast fans 12 will blow air into the furnace 1 to assist burning and the blast fan 111 will also blow air into the furnace through the opening 11 to prevent smoke or flame from coming out therefrom. In FIG. 5 the larger particles 51 will be sucked into the holes 141 of the pipes 14 and conveyed into the inner top portion of the furnace 1 through the conveying pipes 21. The fan 23 and the guide plate 24 will produce a whirlpool to blow the particles 51 downwardly for a further burning until the particles 51 is burned entirely and becomes ashes 52. The smoke caused from burning waste material is blown out through the exhausting pipes 31 and toward the arcuate screen 41 as shown in FIG.4. The ashes 52 upon attached to the arcuate screen 31 will be flushed by water and out of the screen 41 downwardly and into the sedimentary tank 42 and decomposed.

The ashes in the furnace 1 may be cleaned through the door 16. Since the ashes both from the furnace 1 and from the decomposition contain not any impurities, the ashes is the best material to produce asbestos, such as firebrick, . . . etc.

Upon the waste material in the furnace 1 is burned into ashes thoroughly, scrap metal may be placed into the furnace 1 through the door 15 to utilize the remaining heat to dissolve the plastic cover.

Figure 6:
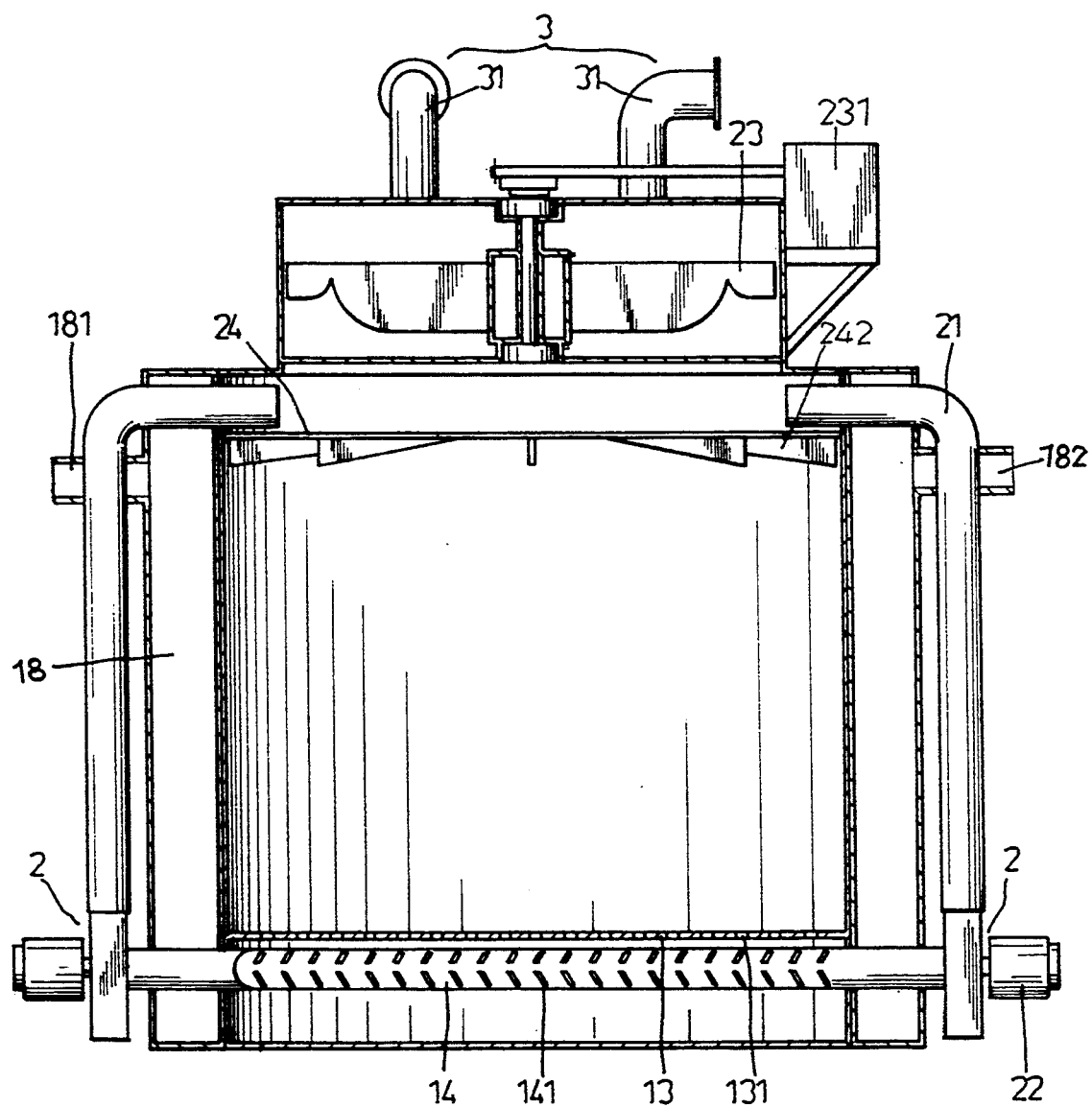
FIG. 6 is a second embodiment of the present invention.

Another embodiment of the present invention is to form a circular water tank 18 is integrally formed on the furnace 1 to utilize the heat of burning waste material to boil water which will produce steam as shown in FIG. 6. The steam will be used to generate power or electricity for other purpose.

I claim:

1. A renovated incinerator including a furnace, a circulating means and an exhausting means and the improvements comprising:

said furnace having a partition located at an inner bottom portion thereof, said partition having through holes for ashes to pass therethrough, a pair of tubes mounted underneath said partition having openings formed therethrough adapted to suck large particles of waste material into said tubes, said tubes having respective opposing ends extending external said furnace;

said circulating means having a pair of conveying pipes extending external said furnace, a fan mounted in top portion of said furnace and a guide plate positioned underneath said fan, each of said conveying pipes having one end connected to said tubes of said furnace through a blast fan and an opposing end of each of said conveying pipes extending internal said furnace between said fan and said guide plate for creating a whirlpool effect to blow said large particles downwardly for further burning.

2. A renovated incinerator of claim 1 wherein said furnace includes a circular water tank integrally formed on the body of said furnace to generate power or electricity with the steam from a boiling water.

* * * * *